United States Patent
Liu et al.

(10) Patent No.: US 10,767,473 B2
(45) Date of Patent: Sep. 8, 2020

(54) SYSTEMS AND METHODS FOR DETECTION OF INDUCED MICRO FRACTURES

(71) Applicant: Saudi Arabian Oil Company, Dhahran (SA)

(72) Inventors: Hui-Hai Liu, Katy, TX (US); Jilin Zhang, Cypress, TX (US); Gary Eppler, Baytown, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/426,189

(22) Filed: May 30, 2019

(65) Prior Publication Data

US 2019/0368350 A1 Dec. 5, 2019

Related U.S. Application Data

(60) Provisional application No. 62/677,767, filed on May 30, 2018.

(51) Int. Cl.
*E21B 49/02* (2006.01)
*G01N 15/08* (2006.01)
*E21B 43/26* (2006.01)

(52) U.S. Cl.
CPC .............. *E21B 49/02* (2013.01); *E21B 43/26* (2013.01)

(58) Field of Classification Search
CPC ...... E21B 49/006; E21B 49/02; G01N 15/082

USPC .............. 175/58; 73/152.05, 152.07, 152.11; 166/250.02; 702/6
See application file for complete search history.

(56) References Cited

U.S. PATENT DOCUMENTS

| 4,538,460 A | 9/1985 | Schettler, Jr. |
| 4,799,382 A | 1/1989 | Sprunt et al. |
| 5,277,062 A | 1/1994 | Blauch et al. |

(Continued)

OTHER PUBLICATIONS

Zheng, Jiangtao et al.; "Relationships between permeability, porosity and effective stress for low-permeability sedimentary rock" International Journal of Rock Mechanics & Mining Sciences 78 (2015); pp. 304-318.

(Continued)

*Primary Examiner* — Kenneth L Thompson
(74) *Attorney, Agent, or Firm* — Bracewell LLP; Constance G. Rhebergen; Vivek P. Shankam

(57) ABSTRACT

Methods and systems for detecting impact of induced micro-fractures in a subsurface formation are disclosed. The method includes determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore.

17 Claims, 5 Drawing Sheets

(56) References Cited

U.S. PATENT DOCUMENTS

| | | | | |
|---|---|---|---|---|
| 5,285,683 | A | * | 2/1994 | Abass ................... E21B 43/26 |
| | | | | 166/308.1 |
| 5,859,367 | A | | 1/1999 | Holbrook |
| 6,167,964 | B1 | * | 1/2001 | Kenter ................ E21B 49/006 |
| | | | | 166/250.01 |
| 6,179,069 | B1 | * | 1/2001 | Zheng ................... E21B 21/00 |
| | | | | 166/308.1 |
| 7,181,380 | B2 | * | 2/2007 | Dusterhoft ........... E21B 49/006 |
| | | | | 166/250.07 |
| 8,417,457 | B2 | | 4/2013 | Franquet |
| 2011/0015907 | A1 | * | 1/2011 | Crawford ............. G01V 99/00 |
| | | | | 703/2 |
| 2013/0270011 | A1 | | 10/2013 | Akkurt et al. |
| 2015/0168597 | A1 | * | 6/2015 | Bai ....................... G01V 99/00 |
| | | | | 703/10 |
| 2016/0377754 | A1 | * | 12/2016 | Malik .................... G01V 1/40 |
| | | | | 702/16 |
| 2017/0275970 | A1 | * | 9/2017 | Crawford ............ G01V 99/005 |
| 2019/0055841 | A1 | * | 2/2019 | Brady .................. E21B 47/065 |

OTHER PUBLICATIONS

Bhandari et al., "Anisotropy and Stress Dependence of Permeability in the Barnett Shale", Transport in Porous Media, 2015, pp. 393-411, Spriger Science + Business Media.

International Search Report and Written Opinion for International Application No. PCT/US2019/034690 dated Sep. 6, 2019; pp. 1-16.

Zhu et al., "A Semi-analytical Model for Pressure-Dependent Permeability of the Tight Sandstone Reservoirs", Transport in Porous Media, 2018, pp. 235-252, Springer Science + Business Media.

* cited by examiner

SYSTEMS AND METHODS FOR DETECTION OF INDUCED MICRO FRACTURES

CROSS REFERENCE TO RELATED APPLICATIONS

This application claims priority from U.S. Provisional Application No. 62/677,767, filed May 30, 2018, and titled "SYSTEMS AND METHODS FOR DETECTION OF INDUCED MICRO FRACTURES," the entire contents of which is incorporated here by reference.

BACKGROUND

1. Technical Field

Embodiments relate generally to developing wells, and more particularly to operating hydrocarbons wells to inhibit induced micro-fractures and the impact thereof.

2. Description of Related Art

A well generally includes a wellbore (or "borehole") that is drilled into the earth to provide access to a geologic formation below the earth's surface (or "subsurface formation"). The well may facilitate the extraction of natural resources, such as hydrocarbons and water, from the subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations. The term "oil well" is often used to refer to a well designed to produce oil. Similarly the term "gas well" is often used to refer to a well designed to produce gas. In the case of an oil well, some natural gas is typically produced along with oil. A well producing both oil and natural gas is sometimes referred to as a "oil and gas well" or an "oil well." The term "hydrocarbon well" is often used to describe wells that facilitate the production of hydrocarbons, including oil wells and oil and gas wells.

Creating a hydrocarbon well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir."

SUMMARY

For source rock reservoirs, rock permeability is a key parameter for characterizing the reservoirs and predicting their performance. However, accurate measurement of permeability can be challenging because of the low permeability of source rocks. For laboratory experiments, rock core is taken from the subsurface to the surface before conducting the experiments. Since unloading occurs during this process, the change in effective stress between the subsurface and surface conditions causes micro fractures (in the order of micro-meters), which may have an impact on the core permeability measurements. In other words, induced micro fractures can make core permeability considerably different from the true rock permeability, and the induced micro fractures could be a significant contributor to the laboratory-measured permeability of the rock formation. Accordingly, example embodiments include a method for detecting the existence of induced micro-fractures in core samples and correcting the impact of these micro-fractures in core permeability measurements.

Applicants have recognized that understanding, predicting and minimizing wellbore instability, including wellbore deformation and expansion, can be critical to successfully drilling and operating a well. Operating a hydrocarbon well, such as an oil well, can be difficult, especially in instances in which the wellbore of the well is drilled into formation rock that is susceptible to failures, including breakouts and drilling-induced fractures (DIFs). Applicants have also identified an additional mode of failure, including micro-fractures, that can be critical to understand, and have developed techniques for predicting, characterizing and minimizing the occurrences and effects of micro-fractures.

Accordingly, one embodiment is a method of detecting impact of induced micro-fractures in a subsurface formation. The method includes determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The unloading effective stress may be equal to the effective stress in a reservoir or the difference between an overburden pressure and a pore pressure. The unloading effective stress can be greater than the difference between an overburden pressure and a mud pressure at a coring depth. The method may also include performing permeability measurements for effective stress range between 500 pounds per square inch (psi) and 9000 psi, plotting the permeability measurements as a function of the effective stress for the core sample with micro-fractures, and determining the fracture closure stress from the plot. The unloading effective stress and fracture closure stress may be vertical stresses or normal stresses for the induced micro-fracture. The step of determining the fracture closure stress further may include determining the stress corresponding to transition from a more-stress-sensitive first stage to a less-stress-sensitive second stage. The step of operating the well system to inhibit impact of micro-fractures in the wellbore further may include correcting the effect of micro-fracture on the permeability measurements of the core sample, and determining a true permeability as a function of stress. Operating the well to inhibit the occurrence of micro-fractures may include circulating into the wellbore oil based drilling fluids. Additionally, in response to determining that the formation rock is susceptible to micro-fractures, the method may include determining a threshold drilling fluid density. Operating the well to inhibit the occurrence of micro-fractures may include circulating into the wellbore drilling fluids having a fluid density that is equal to or less than the threshold drilling fluid density.

Another embodiment is a non-transitory computer readable storage medium comprising program instructions stored thereon that are executable by a processor to perform the operations including determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The operations may also include performing permeability measurements for effective stress range between 500 psi and 9000 psi, plotting the permeability measurements as a function of the effective stress for the core sample with micro-fractures, and determining the fracture closure stress from the plot.

Another example embodiment is a hydrocarbon production well system. The system may include a well system, and a well control system configured to perform operations including determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The unloading effective stress may be equal to the effective stress in a reservoir or the difference between an overburden pressure and a pore pressure. The unloading effective stress can be greater than the difference between an overburden pressure and a mud pressure at a coring depth. The system may also include performing permeability measurements for effective stress range between 500 psi and 9000 psi, plotting the permeability measurements as a function of the effective stress for the core sample with micro-fractures, and determining the fracture closure stress from the plot. The unloading effective stress and fracture closure stress may be vertical stresses or normal stresses for the induced micro-fracture. The step of determining the fracture closure stress further may include determining the stress corresponding to transition from a more-stress-sensitive first stage to a less-stress-sensitive second stage. The step of operating the well system to inhibit impact of micro-fractures in the wellbore further may include correcting the effect of micro-fracture on the permeability measurements of the core sample, and determining a true permeability as a function of stress. Operating the well to inhibit the occurrence of micro-fractures may include circulating, into the wellbore, oil based drilling fluids. Additionally, in response to determining that the formation rock is susceptible to micro-fractures, the system may determine a threshold drilling fluid density. Operating the well to inhibit the occurrence of micro-fractures may include circulating into the wellbore drilling fluids having a fluid density that is equal to or less than the threshold drilling fluid density.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the embodiments. Like reference numerals refer to like elements throughout the specification.

DETAILED DESCRIPTION

Figure 1:
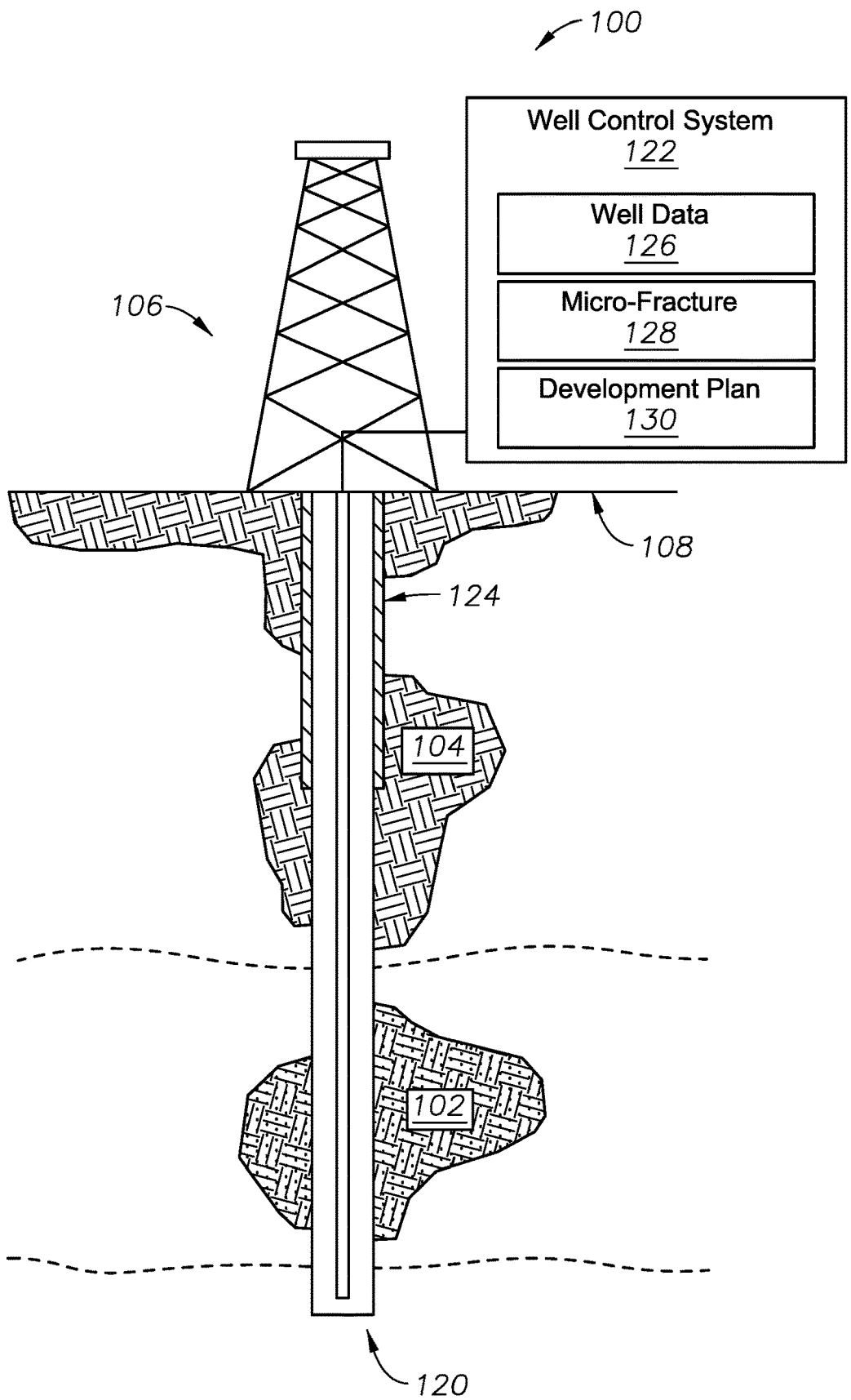
FIG. 1 is diagram that illustrates a well environment in accordance with one or more embodiments.

The methods and systems of the present disclosure will now be described with reference to the accompanying drawings in which embodiments are shown. The methods and systems of the present disclosure may be in many different forms and should not be construed as limited to the illustrated embodiments set forth here; rather, these embodiments are provided so that this disclosure will be thorough and complete, and will fully convey its scope to those skilled in the art.

Described are embodiments of novel systems and methods for minimizing wellbore instability, including wellbore deformation and expansion of formation rock at the walls of wellbores by way of micro-fractures. Embodiments include predicting the occurrence and extent of the instability and failure of formation rock at the walls of wellbores by way of micro-fractures, a failure mode that is not considered or accounted for by existing techniques, and include techniques for inhibiting the occurrence of, and reducing the effects of, the failure of formation rock at the walls of wellbores by way of micro-fractures. In some embodiments, the technique includes predicting (or otherwise determining) that a wellbore is susceptible to micro-fractures in response to determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The unloading effective stress may be equal to the effective stress in a reservoir or the difference between an overburden pressure and a pore pressure. The unloading effective stress can be greater than the difference between an overburden pressure and a mud pressure at a coring depth. The method may also include performing permeability measurements for effective stress range between 500 psi and 9000 psi, plotting the permeability measurements as a function of the effective stress for the core sample with micro-fractures, and determining the fracture closure stress from the plot. The unloading effective stress and fracture closure stress may be vertical stresses or normal stresses for the induced micro-fracture. The step of determining the fracture closure stress further may include determining the stress corresponding to transition from a more-stress-sensitive first stage to a less-stress-sensitive second stage. The step of operating the well system to inhibit impact of micro-fractures in the wellbore further may include correcting the effect of micro-fracture on the permeability measurements of the core sample, and determining a true permeability as a function of stress. Operating the well to inhibit the occurrence of micro-fractures may include circulating, into the wellbore, oil based drilling fluids. Additionally, in response to determining that the formation rock is susceptible to micro-fractures, the method may include determining a threshold drilling fluid density. Operating the well to inhibit the occurrence of micro-fractures may include circulating into the wellbore drilling fluids having a fluid density that is equal to or less than the threshold drilling fluid density. For example, it may be predicted that a segment of wellbore is susceptible to micro-fractures if the segment of a wellbore exhibits each of the characteristics previously described. The technique can also include operating the well to inhibit the occurrence of, and reduce the effects of, micro-fractures, in response to predicting that a segment of wellbore is susceptible to micro-fractures. For example, for a well determined to be susceptible to micro-fractures, the wellbore may be drilled using a particular type of drilling fluid (for example, an oil based drilling mud), using a particular weight of drilling fluid (for example, a relatively low density drilling fluid), or using a drilling fluid additive (for example, lost circulation materials (LCMs)) to inhibit the occurrence of and reduce the effects of micro-fractures. As a further example, completion operations for the well may include casing the segment of the wellbore determined to be susceptible to micro-fractures, to inhibit the occurrence of and reduce the effects of micro-fractures. As yet another example, production operating parameters for the well (for example, production rate or pressure) may be controlled to inhibit the occurrence of and reduce the effects of micro-fractures. In the context of well design, well stimulation operations (for example, hydraulic fracturing or "hydrofracturing"), well models, field models, well designs and associated field development plans (FDPs) may be constrained by parameters to inhibit the occurrence of micro-fractures. The parameters may also specify the use of an oil based drilling fluid having drilling fluid density within a predetermined range. The parameters may also specify a maximum production rate, and a minimum bottom-hole pressure (BHP). Micro-fracture like failures can also occur deep within formation rock, away from a wellbore, for example, as a result of stimulation operations, such as hydraulic fracturing. micro-fractures may indicate that stimulation operations may be less effective or ineffective due to the potential failure of the formation rock, and thus stimulation operations parameters may be adjusted, or stimulation operations may not be performed, to mitigate the risk of micro-fractures occurring in the formation.

Although certain embodiments are described in the context of developing hydrocarbon wells, the techniques described may be applied in other context, such as in the development of water wells and other types of wells.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104 and a well system ("well") 106. The formation 104 may include a porous or fractured rock formation that resides underground, beneath the earth's surface ("surface") 108. In the case of the well 106 being a hydrocarbon well, the reservoir 102 may include a portion of the formation 104 that contains (or that is at least determined to or expected to contain) a subsurface pool of hydrocarbons, such as oil and gas. The formation 104 and the reservoir 102 may each include different layers of rock having varying characteristics, such as varying degrees of permeability, porosity, and fluid saturations. In the case of the well 106 being operated as a production well, the well 106 may facilitate the extraction of hydrocarbons (or "production") from the reservoir 102. In the case of the well 106 being operated as an injection well, the well 106 may facilitate the injection of substances, such as gas or water, into the reservoir 102. In the case of the well 106 being operated as a monitoring well, the well 106 may facilitate the monitoring of various characteristics of the formation 104 or the reservoir 102, such reservoir pressure.

The well 106 may include a wellbore 120 and a well control system ("control system") 122. The control system 122 may control various operations of the well 106, such as well drilling operations, well completion operations, well production operations, or well and formation monitoring operations. In some embodiments, the control system 122 includes a computer system that is the same as or similar to that of computer system 1000 described with regard to at least FIG. 5.

During drilling operations, drilling fluid, such as drilling mud, may be circulated in the wellbore 120. This can provide hydrostatic pressure to support walls of the wellbore 120, to prevent formation fluids from flowing into the wellbore 120, to cool and clean a drill bit, and to carry drill cuttings away from the drill bit and out of the wellbore 120. During a well logging operation, a logging tool may be lowered into to wellbore 120 and be operated to measure characteristics of the wellbore 120 as it moved along a length of the wellbore 120. In some instances, the measurements are recorded in a corresponding well log that provides a mapping of the measurements versus depth in the wellbore 120. During completion operations, various components may be installed (for example, casing or production tubing installed in the wellbore 120) or operations may be undertaken (for example, pumping fluids into the wellbore 120 to fracture, clean or otherwise prepare the reservoir 102 to produce hydrocarbons) to make the well 106 ready to produce hydrocarbons. During production operations, a drilling rig used to drill the well 106 may be removed and replaced with a collection of valves (or a "production tree"), which regulates pressure in the wellbore 120, controls production flow from the wellbore 120, and provides access to the wellbore 120. Flow from an outlet valve of the production tree may be coupled to a distribution network, such as pipelines, storage tanks, and transport vehicles that transport the production to refineries and export terminals.

The wellbore 120 (or "borehole") may include a bored hole that extends from the surface 108 into a target zone of the formation 104, such as the reservoir 102. An upper end of the wellbore 120, at or near the surface 108, may be referred to as the "up-hole" end of the wellbore 120, and a lower end of the wellbore 120, terminating in the formation 104, may be referred to as the "down-hole" end of the wellbore 120. The wellbore 120 may be created, for example, by a drill bit boring through the formation 104 and the reservoir 102. The wellbore 120 may provide for the circulation of drilling fluids during drilling operations, the flow of hydrocarbons (for example, oil and gas) from the reservoir 102 to the surface 108 during production operations, the injection of substances (for example, water) into the formation 104 or the reservoir 102 during injection operations, or the communication of monitoring devices (for example, logging tools) into one or both of the formation 104 and the reservoir 102 during monitoring operations (for example, during in situ logging operations). In some embodiments, the wellbore 120 includes cased or uncased (or "open-hole") portions. A cased portion may include a portion of the wellbore 120 (for example, the up-hole end of the wellbore 120) having casing 124 (for example, casing pipe and casing cement) installed. An uncased portion may include a portion of the wellbore 120 (for example, the down-hole end of the wellbore 120) not having casing 124 installed.

In some embodiments, the control system 122 stores, or otherwise has access to, well data 126. The well data 126 may include data that is indicative of various characteristics of the well 106, the formation 104 or the reservoir 102. The well data 126 may include, for example, a well location, a well trajectory, well logs (for example, caliper logs, ultrasonic logs, or resistivity logs for the well 106), well and formation parameters, and formation rock characteristics. A well location may include coordinates defining the location where the up-hole end of the wellbore 120 penetrates the earth's surface 108. A well trajectory may include coordinates defining a path of the wellbore 120, from the up-hole end of the wellbore 120 to a down-hole end of the wellbore 120. A caliper log may include a log of measurements of the size and shape of the wellbore 120 versus depth in the wellbore 120. The caliper log may be obtained by way of a caliper tool lowered into the wellbore 120, and that measures the size and shape of the wellbore 120 as it is moved along the length of the wellbore 120. An ultrasonic log may include a log of images of the walls of the wellbore 120 versus depth in the wellbore 120. The ultrasonic log may be obtained by way of an ultrasonic logging tool lowered into the wellbore 120, and that acquires ultrasonic images of the walls of the wellbore 120 as it is moved along the length of the wellbore 120. The well and formation parameters may include the pore pressure (Po) of the rock of the formation 104 (or "formation rock"), the drilling fluids pressure (Pw), and maximum and minimum horizontal in-situ stresses ($\sigma H$ and $\sigma h$) in the formation at the wellbore 120. The pore pressure (Po) of the formation rock may be determined based on resistivity, sonic or density logs for the well 106. The drilling fluids pressure (Pw) may be determined based on the density of the drilling fluid present in the wellbore 120. The maximum and minimum horizontal in-situ stresses ($\sigma H$ and $\sigma h$) may be determined, for example, by way of simulation or modeling of the stresses in the formation rock at the walls of the wellbore 120, or based on observations of existing failures of the formation rock at the walls of the wellbore 120 (for example, breakouts or DIFs) and corresponding stresses associated with the failures of the formation rock at the walls of the wellbore 120. In some embodiments, the minimum horizontal stress ($\sigma h$) is estimated from one or more borehole injection tests. A borehole injections test may include injecting fluids, and monitoring a pressure response in the wellbore to generate pressure versus time curves, which can be assessed to determine the minimum horizontal stress ($\sigma h$). The borehole injection tests can include one or more of the following: micro-fracture tests, mini-fracture tests, leak-off tests and massive hydraulic fracturing. Times when fractures open and close can be determined based on assessing the results of these tests, such as interpreting pressure versus time curves to determine when fractures open and close and an associated minimum horizontal stress ($\sigma h$). In some embodiments, the maximum horizontal stress ($\sigma H$) magnitude is derived through failure simulations, failure criteria equations, and full wave sonic logs in vertical wells.

Formation rock characteristics may include a tensile strength (To) of the formation rock at the wall of the wellbore 120, a compressional strength (Co) of the formation rock at the wall of the wellbore 120, a lamination density (DL) of the formation rock at the wall of the wellbore 120, a composition of the formation rock (for example, clay rich laminate) at the wall of the wellbore 120, or a linear swelling ratio (LSR) of the formation rock at the wall of the wellbore 120. The formation rock characteristics may be determined, for example, by way of a laboratory assessment of core samples of the formation, down-hole loggings of the wellbore 120 (or other wellbores in the formation 104) and corresponding well logs, or using known values for formation rock of the formation 104.

In some embodiments, the control system 122 stores, or otherwise has access to, micro-fracture parameters 128. The micro-fracture parameters 128 may specify values for use in assessing whether the wellbore 120 of the well 106 is susceptible to failure by way of micro-fractures. The micro-fracture parameters 128 may include a specified threshold lamination density ($DL_{thres}$) for the wellbore 120, specified characteristics of a clay rich laminate composition, and a specified LSR range for the wellbore 120. The micro-fracture parameters 128 may be predefined, for example, by a well operator.

As described, the control system 122 may assess the formation 104 and the wellbore 120 to determine characteristics of the formation 104 and the wellbore 120, and to determine whether or not the wellbore 120 is susceptible to micro-fractures. In some embodiments, the control system 122 generates, stores or executes a well development plan 130. A well development plan 130 may specify parameters for developing the well 106 (or other wells in the formation 104) to inhibit wellbore failures, including micro-fractures. The parameters may specify parameters for drilling fluid used to drill the well 106 (or other wells in the formation 104) to inhibit the occurrence of, and reduce the effects of, micro-fractures, such as a particular type of drilling fluid (for example, an oil based drilling mud), a particular weight of drilling fluid (for example, a relatively low density drilling fluid), or a drilling fluid additive (for example, lost circulation materials (LCMs). The parameters may specify completion parameters for the well 106 (or other wells in the formation 104) to inhibit the occurrence of, and reduce the effects of, micro-fractures, such as certain intervals of the wellbore 120 to be cased. The parameters may specify production operating parameters for the well 106 (or other wells in the formation 104) to inhibit the occurrence of, and reduce the effects of, micro-fractures, such as production rates and pressures. The parameters may specify simulation parameters for the well 106 (or other wells in the formation 104) to inhibit the occurrence of, and reduce the effects of, micro-fractures. The parameters may also specify the use of an oil based drilling fluid having drilling fluid density within a predetermined range. The parameters may also specify a maximum production rate, and a minimum bottom-hole pressure (BHP).

Another example embodiment is a hydrocarbon production well system. The system may include a well system, and a well control system configured to perform operations including determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The unloading effective stress may be equal to the effective stress in a reservoir or the difference between an overburden pressure and a pore pressure. The unloading effective stress can be greater than the difference between an overburden pressure and a mud pressure at a coring depth. The system may also include performing permeability measurements for effective stress range between 500 psi and 9000 psi, plotting the permeability measurements as a function of the effective stress for the core sample with micro-fractures, and determining the fracture closure stress from the plot. The unloading effective stress and fracture closure stress may be vertical stresses or normal stresses for the induced micro-fracture. The step of determining the fracture closure stress further may include determining the stress corresponding to transition from a more-stress-sensitive first stage to a less-stress-sensitive second stage. The step of operating the well system to inhibit impact of micro-fractures in the wellbore further may include correcting the effect of micro-fracture on the permeability measurements of the core sample, and determining a true permeability as a function of stress. Operating the well to inhibit the occurrence of micro-fractures may include circulating, into the wellbore, oil based drilling fluids. Additionally, in response to determining that the formation rock is susceptible to micro-fractures, the system may determine a threshold drilling fluid density. Operating the well to inhibit the occurrence of micro-fractures may include circulating into the wellbore drilling fluids having a fluid density that is equal to or less than the threshold drilling fluid density.

Figure 2A:
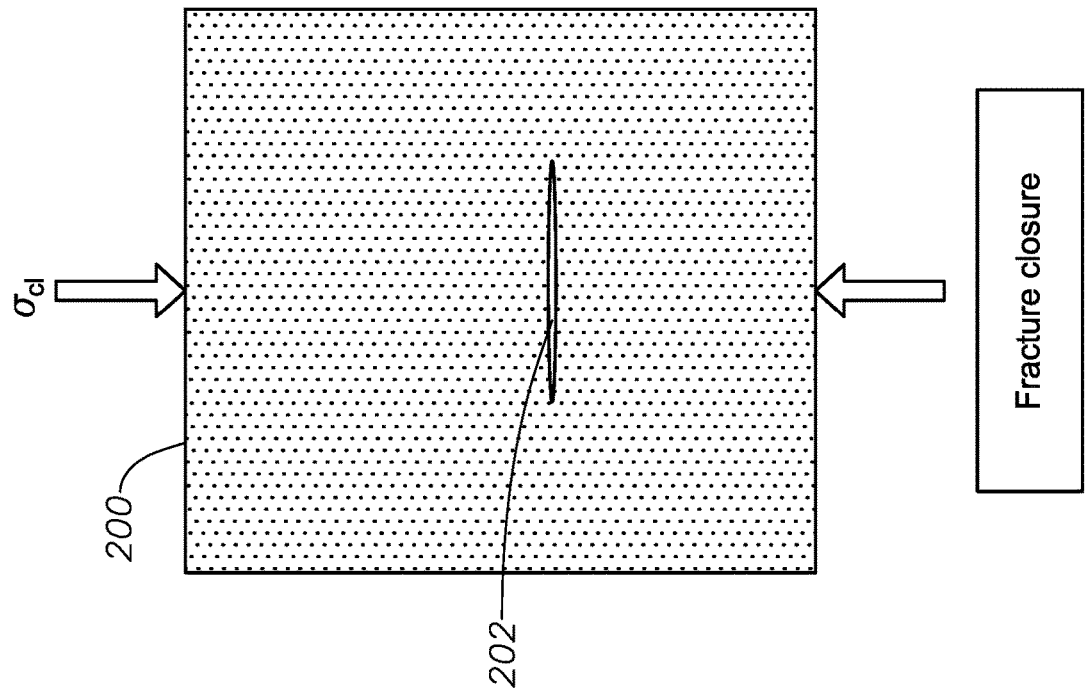
FIG. 2A illustrates effective stress ($\sigma\_ul$) for inducing micro-fractures resulting from unloading, in accordance with one or more embodiments.
Figure 2B:
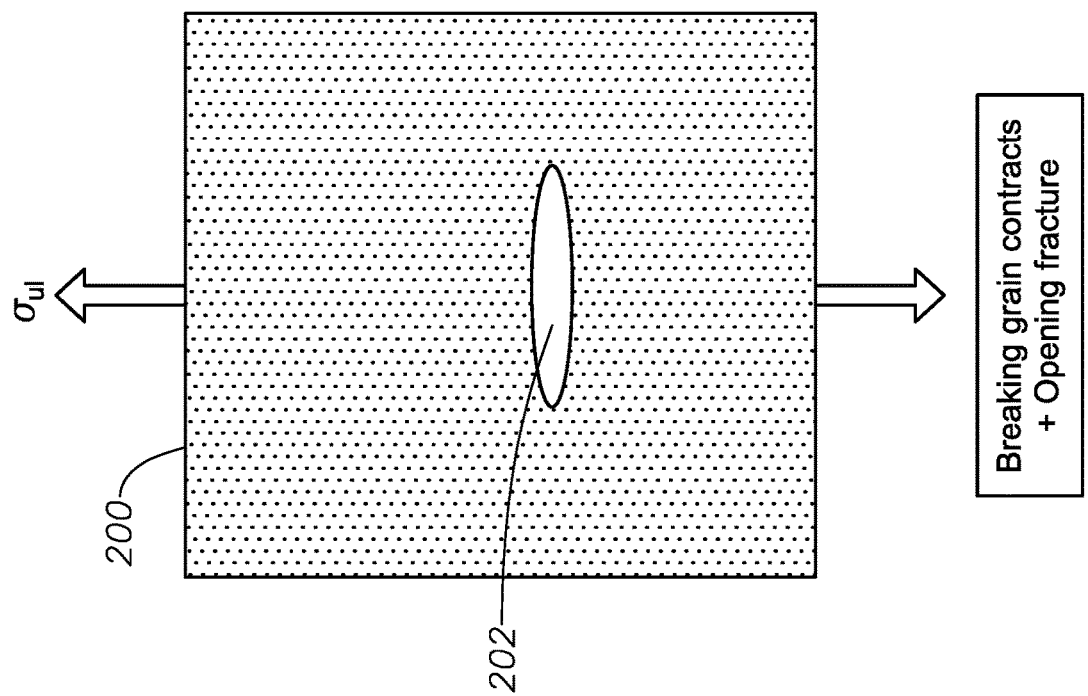
FIG. 2B illustrates effective stress ($\sigma\_cl$) for closing the induced micro fracture, in accordance with one or more embodiments.

Understanding the in-situ stresses of a formation and the resulting modes of failure can be helpful in understanding the described embodiments. Accordingly, one embodiment is a method of detecting impact of induced micro-fractures in a subsurface formation. One example embodiment is a method for correcting impact of micro-fractures in evaluating subsurface formations. The method may include development of a criterion for inducing the micro-fractures in rock samples by an unloading process, determination of fracture-closure effective stress during permeability measurements, and correction of the impacts of induced fractures, if they exist. In one embodiment, a criterion is established for inducing the micro-fractures in rock samples 200 by an unloading process. FIG. 2A, for example, illustrates effective stress ($\sigma_{ul}$) for inducing micro-fractures 202 resulting from unloading, and FIG. 2B illustrates effective stress ($\sigma_{cl}$) for closing the induced micro fracture 202.

When a core sample is taken from the subsurface to the surface, the effective stress, which is the total stress minus pore pressure, can change, resulting in an unloading process. The difference between the in-situ effective stress and that in the surface condition, which is generally zero, is called unloading effective stress ($\sigma_{ul}$). During the coring process, however, there is also a stress release that is equal to the difference between overburden and mud pressure at the coring depth. If this stress change is greater than the stress previously described, then the stress change is considered unloading effective stress ($\sigma_{ul}$). In order to induce a micro-fracture, however, unloading effective stress needs to break the grain contacts along the fracture plane and open the fracture to generate vertical displacement. It should be noted, however, that only vertical stress or the normal stress for the induced micro fracture is considered because source rocks are laminated and have bedding structures along the horizontal direction, and thus micro-fractures are generally aligned along that direction. Secondly, the normal stress can play a dominant role in inducing fractures.

Without the cementation between grains along the induced fracture, the stress needed to open the fracture can be the same as the stress ($\sigma_{cl}$) used to close the induced fracture. Since fractures are opened along the weak planes, the force needed to break the grain contacts may be relatively small, but it is always greater than zero. Thus, the effective stresses $\sigma_{ul}$ and $\sigma_{cl}$ should have the following relationship for induced micro-fractures:

$$\sigma_{ul} \geq \sigma_{cl} \quad (1)$$

Otherwise, the unloading stress is not large enough to induced micro-fractures. In this case, the micro-fractures in the core sample are residual ones. The next step in the method is the determination of fracture closure effective stress.

Figure 3:
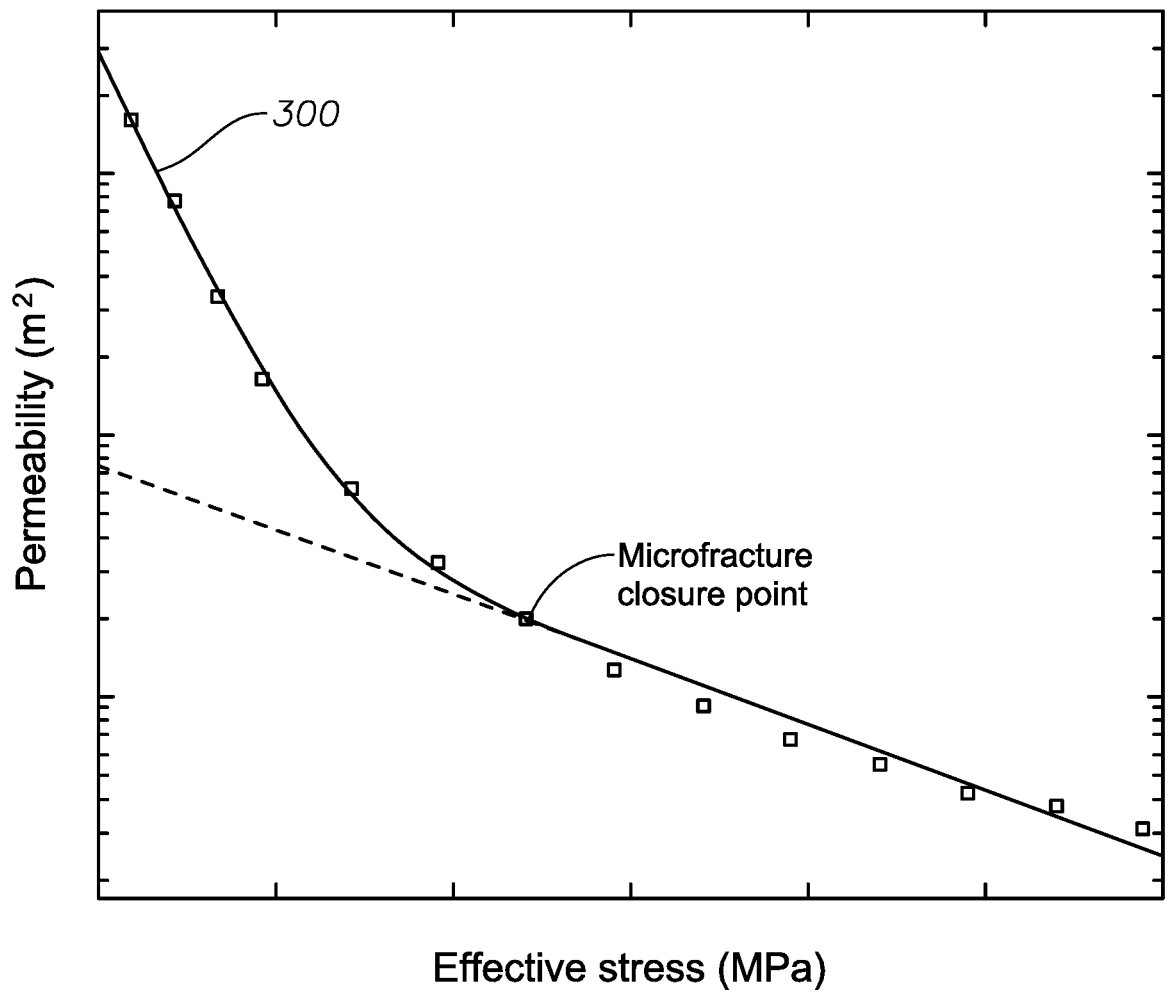
FIG. 3 illustrates a typical permeability curve as a function of effective stress for a core sample with micro fractures, in accordance with one or more embodiments.

FIG. 3 illustrates a typical permeability curve 300 as a function of effective stress for a core sample with micro fractures. The X-axis shows effective stress in mega pascal (MPa) and the Y-axis shows permeability values in square meters ($m^2$). Micro-fractures are generally more-stress-sensitive than other pores. Thus, at relatively low stress, permeability, mainly controlled by micro-fractures, can be reduced relatively quickly with increasing stress. At certain effective stress, micro-fractures are closed and afterwards permeability changes more gradually with increasing stress. The log values of permeability exhibits a straight line with the effective stress. The stress corresponding to the transition from the more-stress-sensitive stage to the less-stress-sensitive second stage is defined as the fracture closure stress (or $\sigma_{cl}$).

The next step in the method is the correction of the impacts of induced fractures. If induced micro fractures exist in a core sample, then their effects on the permeability measurements need to be corrected such that the "true" permeability as a function of stress can be determined. Both theoretical study and empirical evidence indicate that logarithm of permeability versus effective stress is a straight line for samples without micro fractures; that is following the dashed line in FIG. 3. Thus, the dashed line for the whole stress range should be the corrected permeability versus stress curve. With all the previously described elements, the induced micro-fractures can be detected, and their impacts on measured permeability may be corrected.

Accordingly, the method may include calculating the unloading effective stress for the process to take rock samples from the reservoir to the surface. Because the effective stress on the surface is zero, the magnitude of the unloading effective stress is equal to effective stress in reservoir; that is, overburden minus pore pressure. However, during the coring process, there is also a stress release that is equal to the difference between overburden and mud pressure at the coring depth. If this stress change is larger than the stress mentioned previously, this stress change should be considered unloading effective stress ($\sigma_{ul}$). The next step in the method is to prepare the rock sample and perform laboratory permeability measurements for effective stress range between 500 psi and 9000 psi. The next step may include determining the fracture closure stress, as demonstrated in FIG. 3, followed by comparing the unloading stress with the fracture closure stress. If Equation (1) is satisfied, then micro-fractures are induced, and in such a case, the impacts of micro fractures need to be corrected, as previously described. However, if Equation (1) is not satisfied, then unloading stress is not strong enough to induce micro-fractures. In this case, no correction may be needed.

Figure 4:
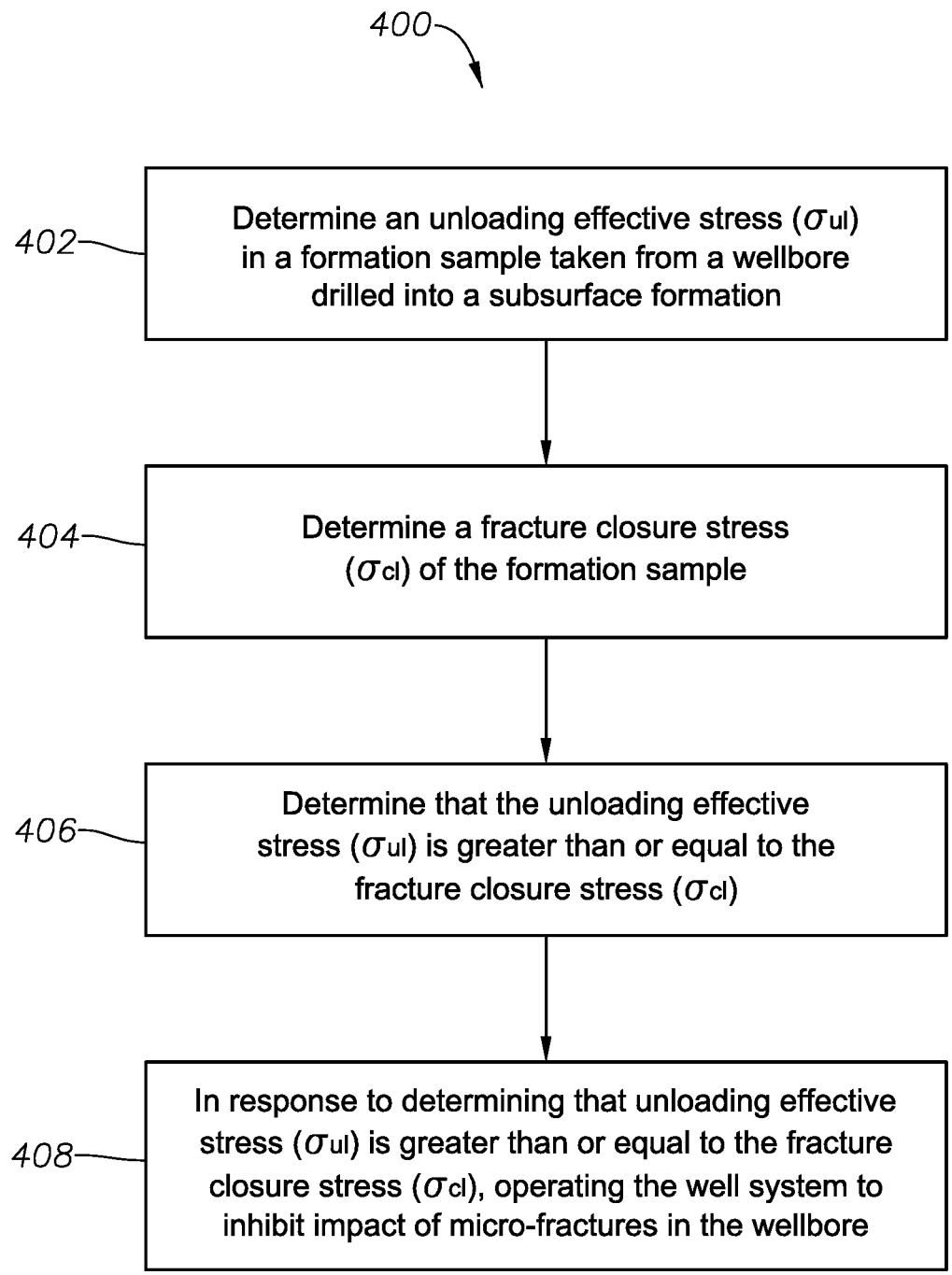
FIG. 4 is a flowchart that illustrates a method of identifying susceptibility of a hydrocarbon well to micro-fractures and operating the hydrocarbon well to inhibit the occurrence of and reduce the effects of micro-fractures, in accordance with one or more embodiments.

Turning now to FIG. 4, one embodiment is a method 400 of detecting impact of induced micro-fractures in a subsurface formation. The method 400 includes determining an unloading effective stress ($\sigma_{ul}$) in a formation sample taken from a wellbore drilled into the subsurface formation at step 402. The method may also include determining a fracture closure stress ($\sigma_{cl}$) of the formation sample at step 404. The method may also include determining that the unloading effective stress ($\sigma_{ul}$) is greater than or equal to the fracture closure stress ($\sigma_{ul}$) at step 406. In response to determining that unloading effective stress ($\sigma_{ul}$) is greater than or equal to the fracture closure stress ($\sigma_{ul}$), the method may include operating the well system to inhibit impact of micro-fractures in the wellbore at step 408. The unloading effective stress may be equal to the effective stress in a reservoir or the difference between an overburden pressure and a pore pressure. The unloading effective stress can be greater than the difference between an overburden pressure and a mud pressure at a coring depth. The method may also include performing permeability measurements for effective stress range between 500 psi and 9000 psi, plotting the permeability measurements as a function of the effective stress for the core sample with micro-fractures, and determining the fracture closure stress from the plot. The unloading effective stress and fracture closure stress may be vertical stresses or normal stresses for the induced micro-fracture. The step of determining the fracture closure stress further may include determining the stress corresponding to transition from a more-stress-sensitive first stage to a less-stress-sensitive second stage. The step of operating the well system to inhibit impact of micro-fractures in the wellbore further may include correcting the effect of micro-fracture on the permeability measurements of the core sample, and determining a true permeability as a function of stress. Operating the well to inhibit the occurrence of micro-fractures may include circulating, into the wellbore, oil based drilling fluids. Additionally, in response to determining that the formation rock is susceptible to micro-fractures, the method may include determining a threshold drilling fluid density. Operating the well to inhibit the occurrence of micro-fractures may include circulating into the wellbore drilling fluids having a fluid density that is equal to or less than the threshold drilling fluid density.

Another embodiment is a non-transitory computer readable storage medium comprising program instructions stored thereon that are executable by a processor to perform the operations including determining an unloading effective stress ($\sigma_{ul}$) in a formation sample taken from a wellbore drilled into the subsurface formation, determining a fracture closure stress ($\sigma_{cl}$) of the formation sample, determining that the unloading effective stress ($\sigma_{ul}$) is greater than or equal to the fracture closure stress ($\sigma_{ul}$), and in response to determining that unloading effective stress ($\sigma_{ul}$) is greater than or equal to the fracture closure stress ($\sigma_{ul}$), operating the well system to inhibit impact of micro-fractures in the wellbore. The operations may also include performing permeability measurements for effective stress range between 500 psi and 9000 psi, plotting the permeability measurements as a function of the effective stress for the core sample with micro-fractures, and determining the fracture closure stress from the plot.

Figure 5:
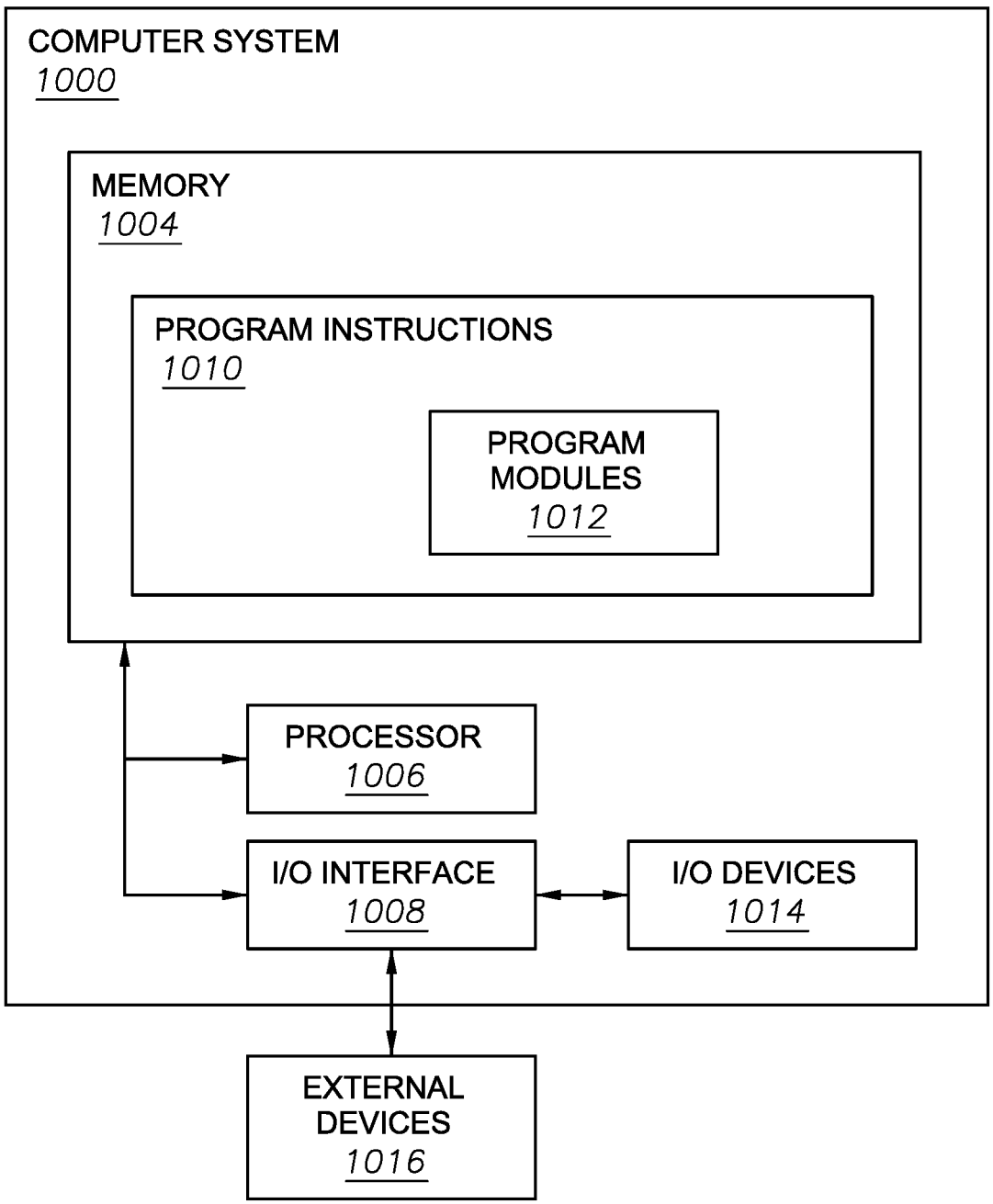
FIG. 5 is a diagram that illustrates an example computer system, in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (for example, the processor 1006) to cause the functional operations described, such as those described with regard to the well control system 122 or the method 400.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016, such as sensors, valves, pumps, motors, other computers and networks. In some embodiments, the I/O interface 1008 includes one or both of an antenna and a transceiver. In some embodiments, the external devices 1016 include a well pressure sensor, a well flowrate sensor, or a logging tool.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms "processing," "computing," "calculating," "determining," refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

The Specification, which includes the Summary, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure belongs unless defined otherwise.

Conditional language, such as, among others, "can," "could," "might," or "may," unless specifically stated otherwise, or otherwise understood within the context as used, is generally intended to convey that certain implementations could include, while other implementations do not include, certain features, elements, and operations. Thus, such conditional language generally is not intended to imply that features, elements, and operations are in any way required for one or more implementations or that one or more implementations necessarily include logic for deciding, with or without user input or prompting, whether these features, elements, and operations are included or are to be performed in any particular implementation.

The systems and methods described here, therefore, are well adapted to carry out the objects and attain the ends and advantages mentioned, as well as others that are inherent. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed here and the scope of the appended claims.

The invention claimed is:

1. A method of detecting impact of induced micro-fractures in a subsurface formation, the method comprising:
   determining an unloading effective stress ($\sigma_{ul}$) in a formation sample taken from a wellbore drilled into the subsurface formation;
   determining a fracture closure stress ($\sigma_{cl}$) of the formation sample;
   determining that the unloading effective stress ($\sigma_{ul}$) is greater than or equal to the fracture closure stress ($\sigma_{ul}$); and
   in response to determining that unloading effective stress ($\sigma_{ul}$) is greater than or equal to the fracture closure stress ($\sigma_{ul}$), operating the well system to inhibit impact of micro-fractures in the wellbore, wherein operating the well to inhibit impact of micro-fractures comprises circulating, into the wellbore, oil based drilling fluids.

2. The method according to claim 1, wherein the unloading effective stress is equal to the effective stress in a reservoir or the difference between an overburden pressure and a pore pressure.

3. The method according to claim 1, wherein the unloading effective stress is greater than the difference between an overburden pressure and a mud pressure at a coring depth.

4. The method according to claim 1, further comprising:
   performing permeability measurements for effective stress range between 500 psi and 9000 psi;
   plotting the permeability measurements as a function of the effective stress for the core sample with micro-fractures; and
   determining the fracture closure stress from the plot.

5. The method according to claim 1, wherein the unloading effective stress and fracture closure stress are vertical stresses or normal stresses for the induced micro-fracture.

6. The method according to claim 1, wherein determining the fracture closure stress further comprises determining the stress corresponding to transition from a more-stress-sensitive first stage to a less-stress-sensitive second stage.

7. The method according to claim 1, wherein operating the well system to inhibit impact of micro-fractures in the wellbore further comprises correcting the effect of micro-fracture on the permeability measurements of the core sample, and determining a true permeability as a function of stress.

8. The method according to claim 1, further comprising:
in response to determining that the subsurface formation is susceptible to micro-fractures, determining a threshold drilling fluid density, wherein operating the well to inhibit the occurrence of micro-fractures comprises circulating, into the wellbore, drilling fluids having a fluid density that is equal to or less than the threshold drilling fluid density.

9. A non-transitory computer readable storage medium comprising program instructions stored thereon that are executable by a processor to perform the following operations:
determining an unloading effective stress ($\sigma_{ul}$) in a formation sample taken from a wellbore drilled into a subsurface formation;
determining a fracture closure stress ($\sigma_{cl}$) of the formation sample;
determining that the unloading effective stress ($\sigma_{ul}$) is greater than or equal to the fracture closure stress ($\sigma_{ul}$);
in response to determining that unloading effective stress ($\sigma_{ul}$) is greater than or equal to the fracture closure stress ($\sigma_{ul}$), operating the well system to inhibit impact of micro-fractures in the wellbore;
performing permeability measurements for effective stress range between 500 psi and 9000 psi;
plotting the permeability measurements as a function of the effective stress for the core sample with micro-fractures; and
determining the fracture closure stress from the plot.

10. A hydrocarbon production well system, comprising:
a well system; and
a well control system configured to perform the following operations:
determining an unloading effective stress ($\sigma_{ul}$) in a formation sample taken from a wellbore drilled into a subsurface formation;
determining a fracture closure stress ($\sigma_{cl}$) of the formation sample;
determining that the unloading effective stress ($\sigma_{ul}$) is greater than or equal to the fracture closure stress ($\sigma_{ul}$);
in response to determining that unloading effective stress ($\sigma_{ul}$) is greater than or equal to the fracture closure stress ($\sigma_{ul}$), operating the well system to inhibit impact of micro-fractures in the wellbore, wherein operating the well to inhibit impact of micro-fractures comprises circulating, into the wellbore, oil based drilling fluids.

11. The system according to claim 10, wherein the unloading effective stress is equal to the effective stress in a reservoir or the difference between an overburden pressure and a pore pressure.

12. The system according to claim 10, wherein the unloading effective stress is greater than the difference between an overburden pressure and a mud pressure at a coring depth.

13. The system according to claim 10, further comprising:
performing permeability measurements for effective stress range between 500 psi and 9000 psi;
plotting the permeability measurements as a function of the effective stress for the core sample with micro-fractures; and
determining the fracture closure stress from the plot.

14. The system according to claim 10, wherein the unloading effective stress and fracture closure stress are vertical stresses or normal stresses for the induced micro-fracture.

15. The system according to claim 10, wherein determining the fracture closure stress further comprises determining the stress corresponding to transition from a more-stress-sensitive first stage to a less-stress-sensitive second stage.

16. The system according to claim 10, wherein operating the well system to inhibit impact of micro-fractures in the wellbore further comprises correcting the effect of micro-fracture on the permeability measurements of the core sample, and determining a true permeability as a function of stress.

17. The system according to claim 10, further comprising:
in response to determining that the subsurface formation is susceptible to micro-fractures, determining a threshold drilling fluid density, wherein operating the well to inhibit the occurrence of micro-fractures comprises circulating, into the wellbore, drilling fluids having a fluid density that is equal to or less than the threshold drilling fluid density.

* * * * *